Sept. 29, 1931.  M. A. MILLER  1,825,535
SUPPORT FOR BAKING CRUST
Filed April 17, 1928
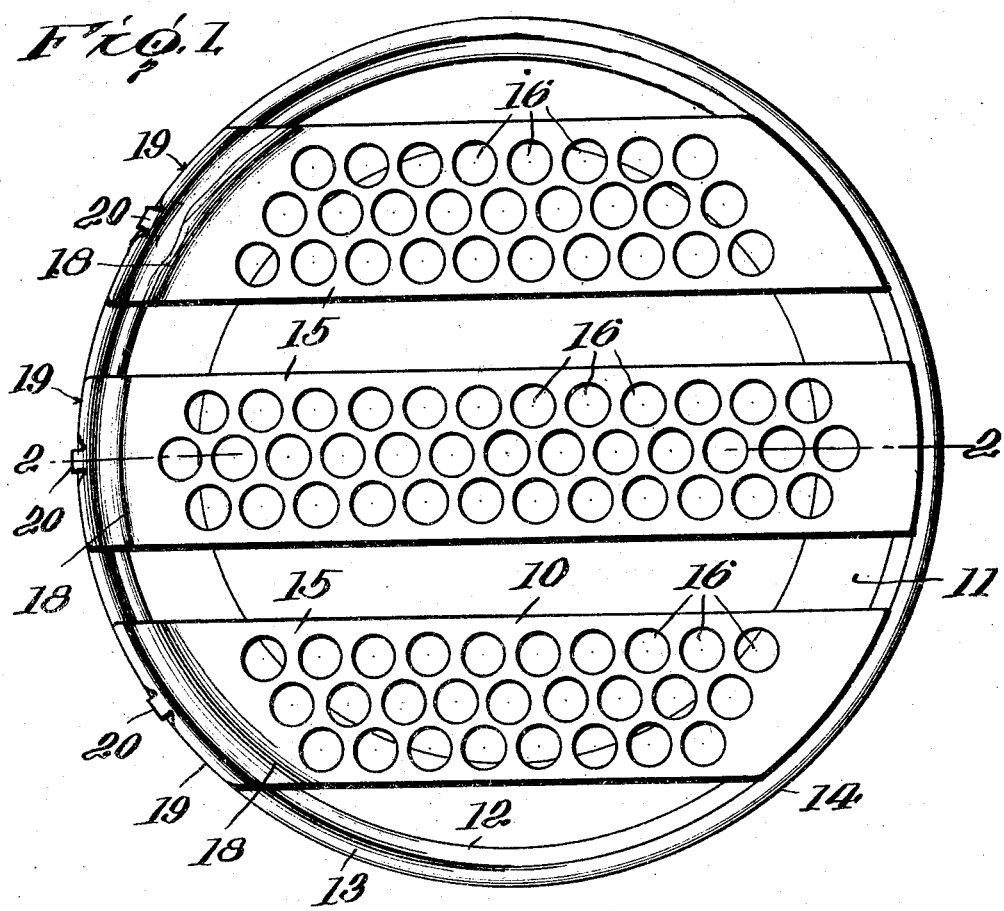
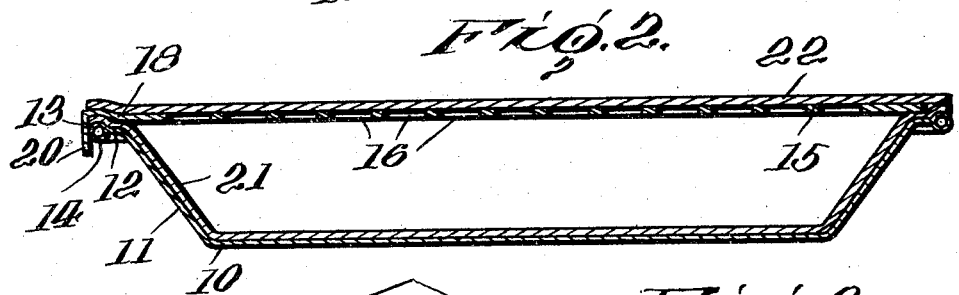
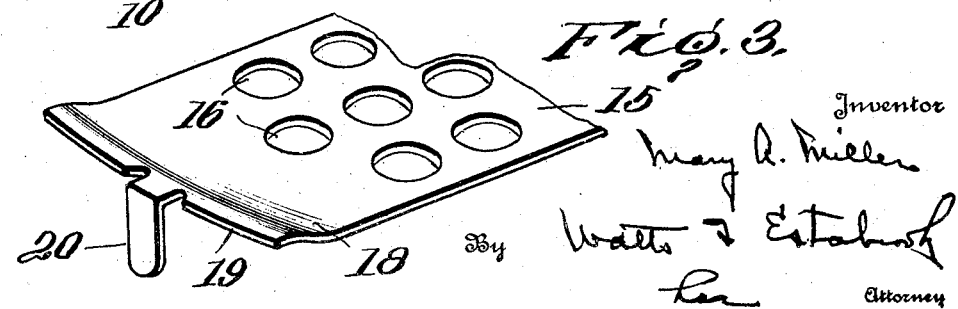
Inventor
Mary A. Miller
By Watts & Estabrook
Attorney Patented Sept. 29, 1931

1,825,535

UNITED STATES PATENT OFFICE

MARY A. MILLER, OF LANCASTER, PENNSYLVANIA

SUPPORT FOR BAKING CRUST

Application filed April 17, 1928. Serial No. 270,717.

This invention relates to an improvement in supports for baking crusts, and is an improvement on my patent granted August 30, 1927, No. 1,641,090.

An object of the invention is to maintain the crust above the contents of the pan during cooking or baking so that the crust will not become saturated with the juices of the pan contents, but will receive the full flavor of the filler and be in a rigid, flaky and crisp condition.

The foregoing is accompanied by providing the wall of the pan with an annular shoulder or recess in which is received a number of perforated bars or plates which extend across the top of the pan. Upon the completion of the baking operation the bars or plates may be withdrawn from beneath the crust without breaking or injuring the top crust, as the shortening in the crust will prevent the bars or plates from sticking to the crust or pastry.

The invention consists of certain novel features of construction and combinations of parts which will be hereinafter described and pointed out in the claims.

In the accompanying drawings:

Figure 1 is a top plan view of the invention,

Figure 2 is a longitudinal vertical sectional view with the receptacle lined with the dough and also having a dough covering upon the supporting bars, and Figure 3 is a detail perspective of an end of a supporting bar.

The pan 10, is made of metal, preferably aluminum, of various depths, and the side wall 11, is flared or conical in shape merging into an outwardly extending flange 12 at the upper edge thereof, with a curved or rounding surface at the juncture between the wall 11 and the flange 12 to eliminate any abrupt shoulders. From the flange 12, a rim 13, is formed, extending upwardly from the flange at an acute angle, producing a conical surface on a greater angle than the flaring or conical surface of the wall 11, and is then turned downwardly and inwardly forming a rounded outer edge or bead 14.

Extending transversely of the pan and resting on the flange 12, are a plurality of supporting bars or plates 15, 15, preferably provided with a series of rows of perforations 16. The ends of the bars are curved at 17—17 to conform to the interior curvature of the pan. An end of each supporting member or bar 15 extends upwardly at an acute angle as at 18, engaging the rim 13 adjacent the upper edge thereof and then projects outwardly at right angles over the top of the rim and bead 14, forming a flange 19. Projecting downwardly from the flange 19 of each supporting member or bar 15, is a lip 20, adapted to be engaged by the fingers of the operator or a suitable instrument for withdrawing the bars from the pan.

The pan 10, is lined with dough 21 extending over the flange 12, rim 13 and bead 14, whereupon the filler is introduced into the pan. The three crust supporting members or bars 15 are then placed over the pan and gently forced or pressed down onto the flange 12, with the flange 19 of each bar overlying the bead 14. The top pastry or dough 22 is now laid on and the overhanging dough trimmed off. When the baking is complete the supporting bars 15 may be withdrawn by a direct outward pull on engaging the lip 20 of the various bars with any suitable instrument without danger of breaking the crust or covering 22. The shortening in the dough will prevent this and the crust will be found to be rigid, flaky and crisp and carrying the full flavor of the filler without being saturated with the juices and causing the contents of the pan to overflow into the oven as would be the case if these supporting means 15, were omitted. These supports hold the top of the pie so that it will not sag during the baking operation and permits the filler to expand under the heat of cooking and completely occupy the pastry without running over the edges of the pan.

By providing each supporting member with an upwardly inclined or sloping portion 18, and the flange 19, the bars may be easily withdrawn by grasping the lips 20, as the inclination of the portion 18, of the bars is such that the portion 18 will slide over the top of the rim 13 and bead 14 and from beneath the crust 22 without danger of breaking the crust, when a direct outward pull is applied to the lips 20.

These bars are preferably provided with perforations which allow the vapors from the filler to pass up into the top crust and flavor it, so that the toothsomeness of the pie is not affected by these bars but insures the crust deriving the benefits of the filler and at the same time permitting it to be browned and preventing it becoming saturated and soggy by the juices of the filler.

These pans are intended to be made of various sizes wherein a deep pan would be employed for meat and oyster pies and the usual shallow pan for fruit pies, and while it has been shown circular in shape it is possible to make these pans rectangular, or other shapes, and having the ends of the bars 15 constructed to conform with the contour of the rim 13 of the pan regardless of its shape.

Having described my invention what I claim as new and desire to secure by Letters Patent is:

1. A support for baking crust, comprising a receptacle having a flange extending outwardly from the upper edge thereof, and a rim portion extending upwardly from the outer edge of said flange, a plurality of supporting members extending in spaced relation across the receptacle and removably resting on said flange for supporting a dough covering, one end of each of said supporting members abutting the inside of the rim portion for confining the members within the receptacle, and means on the other ends of said supporting members resting on said flange and projecting upwardly along said rim and extending outwardly therebeyond so that the members may be withdrawn from beneath the baked covering.

2. A support for baking crust, comprising a receptacle having a bottom and upwardly extending side wall, a flange extending outwardly from the upper edge of said side wall, and a rim portion extending upwardly from the outer edge of said flange, a plurality of supporting members extending in spaced relation across the receptacle and removably resting on said flange for supporting a dough covering, one end of each of said supporting members abutting the inside of the rim portion for confining the members within the receptacle, and the other end of each supporting member resting on said flange and extending upwardly along said rim portion and projecting beyond the upper edge thereof whereby the members may be withdrawn from beneath the baked covering.

MARY A. MILLER.